United States Patent [19]

Fizer

[11] 4,023,277
[45] May 17, 1977

[54] COMBINED MEASURING TAPE AND COMPASS

[76] Inventor: Charlie W. Fizer, General Delivery, Grassy Meadows, W. Va. 24943

[22] Filed: Dec. 29, 1975

[21] Appl. No.: 644,731

[52] U.S. Cl. .................................. 33/27 C; 33/138
[51] Int. Cl.² .......................................... B43L 9/04
[58] Field of Search ........................... 33/27 C, 138

[56] References Cited

UNITED STATES PATENTS

| | | | |
|---|---|---|---|
| 2,582,488 | 1/1952 | Kroenlein | 33/27 C |
| 2,651,843 | 9/1953 | Goodford | 33/27 C |
| 2,869,237 | 1/1959 | Berge | 33/27 C |
| 2,976,614 | 3/1961 | Matuszewski et al. | 33/27 C |
| 3,011,263 | 12/1961 | Unger | 33/138 X |
| 3,120,059 | 2/1964 | Querot | 33/27 C |
| 3,731,389 | 5/1973 | King | 33/27 C |

*Primary Examiner*—Charles E. Phillips

[57] ABSTRACT

A device for use as a measuring tape and as a compass. A hollow housing generally rectangular in shape has a vertical front surface with a lower opening therein and a horizontal bottom surface with a front opening. The lower and front openings join each other. The housing has an inner partition which extends vertically upward from the bottom surface and horizontally inward from the front surface to divide the interior of the housing into a small first compartment formed between these surfaces and the partition and a large second compartment in the remainder of the housing. The partition has an opening in the upwardly extending portion. A measuring tape is disposed in rolled up condition in the second compartment with a front end extending through the partition opening. The tape is manually unwindable. The front end of the tape has a hole. Windup means is disposed in the second compartment to normally maintain said tape in wound up condition. A holder for detachably receiving a chalk or the like is secured to the front end of the tape and extends at right angles to the major surfaces of the tape whereby a chalk disposed in the holder has a tip extending downwardly through the hole. The holder normally fits into the first compartment. A pointed member is secured to said bottom surface of the housing remote from the front opening and points vertically downward.

4 Claims, 5 Drawing Figures

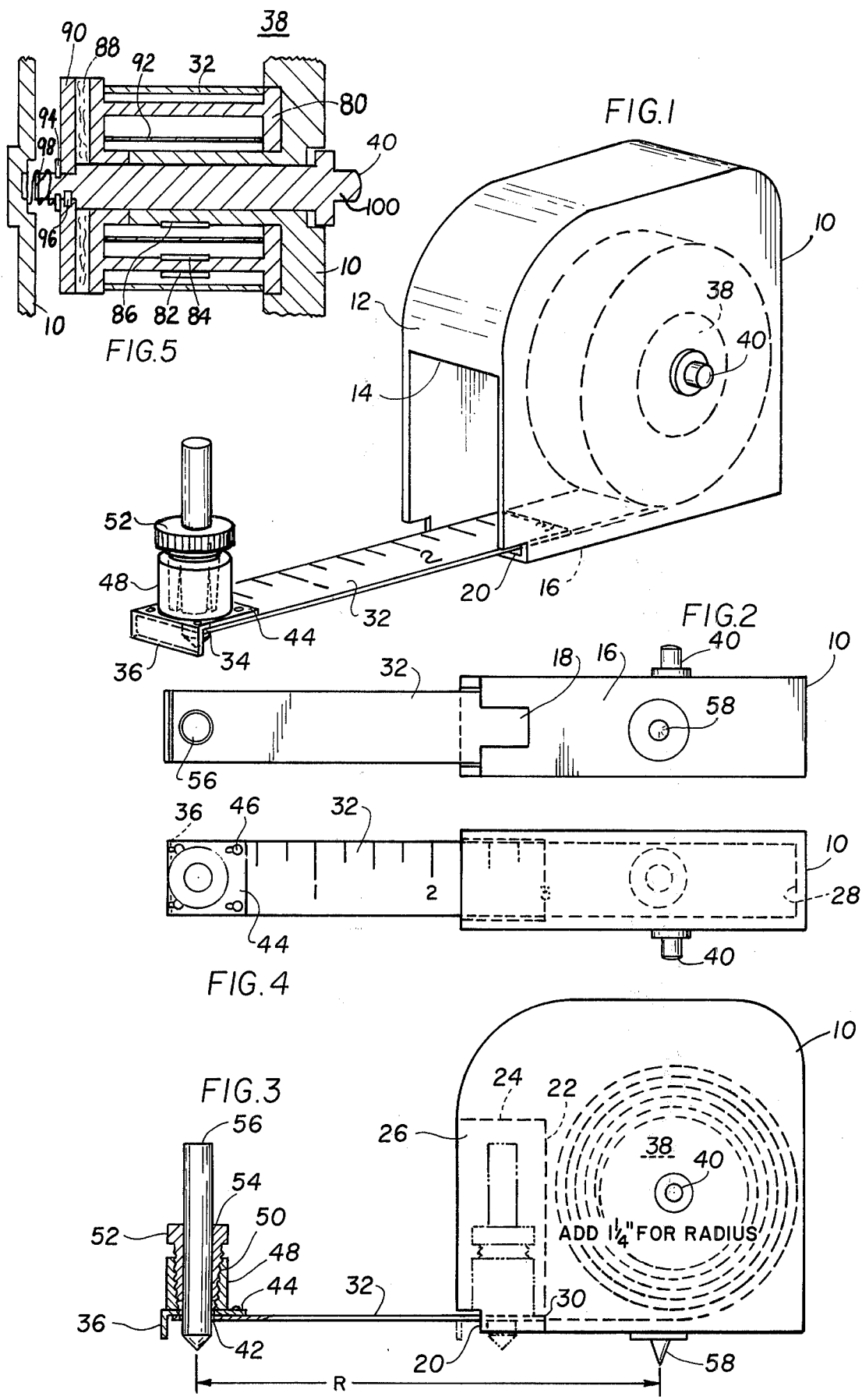

COMBINED MEASURING TAPE AND COMPASS

SUMMARY OF THE INVENTION

This invention is directed toward a device which can be used as a roll-up type measuring device and as a compass. To this end, the device employs a hollow housing generally rectangular in shape having a vertical front surface with a lower opening therein and a horizontal bottom surface with a front opening. The lower and front openings join each other. The housing has an inner partition which extends vertically upward from the bottom surface and horizontally inward from the front surface to divide the interior of the housing into a small first compartment formed between these surfaces and the partition and a large second compartment in the remainder of the housing. The partition has an opening in the upwardly extending portion.

A measuring tape is disposed in rolled up condition in the second compartment with a front end extending through the partition opening. The tape is manually unwindable. The front end of the tape has a hole.

Windup means is disposed in the second compartment to normally maintain said tape in wound up condition.

A holder for detachably receiving a chalk or the like, secured to the front end of the tape and extending at right angles to the major surfaces of the tape whereby a chalk disposed in the holder has a tip extending downwardly through the hole, said holder normally fitting into the first compartment. A pointed member secured to said bottom surface of the housing remote from the front opening and pointing vertically downward.

In use, the tape portion can be used for measurements in conventional manner. In addition with the member used as a center, the holder with chalk or other writing implement in place can be used to draw circles or area. The diameter of the circles is of course determined by the unrolled length of tape. If desired, the tape and holder can be disposed in the housing and the device can still be used as a compass.

BRIEF DESCRIPTION OF THE DRAWINGS

FIG. 1 is a perspective view of the invention.
FIG. 2 is a top view thereof.
FIG. 3 is a side view thereof.
FIG. 4 is a bottom view thereof.
FIG. 5 is a detail cutaway view of the manually operable locking mechanism.

DETAILED DESCRIPTION OF PREFERRED EMBODIMENTS

Referring now to FIGS. 1-5, a hollow narrow generally rectangular housing 10 formed of metal, plastic or the like has a front vertical surface 12 with a lower opening 14 therein and a horizontal bottom surface 16 with a longitudinal narrow opening 18 therein. These openings join each other in a cutout region 20. A partition has a vertical inner wall 22 spaced from opening 14 and a horizontal wall 24 extending from the top of wall 22 to surface 10 to define a first small compartment 26. The remainder of the housing forms a second large compartment 28. Wall 22 has a horizontal slit of opening 30.

A flexible windup type measuring tape 32 calibrated in feet and inches is disposed in compartment 28 with a front end 34 extending through slit 30 and terminating in a lip 36 which engages region 20 when the tape is fully wound up. A windup mechanism 38 normally winds the tape up. When the tape is manually unwound it remains unwound until manual release button 40 is depressed whereby the tape is automatically wound up.

The front end of the tape has hole 42. A plate 44 having a central hole aligned with hole 42 is secured to the tape (which can also be of metal, plastic or the like) by rivets 46. A vertical hollow cylinder 48 open at both ends is secured to the plate and extends outward at right angles. The cylinder has a downwardly and inwardly tapering threaded bore 50. A mating screw type member 52 has a central bore 54 through which chalk 56 or the like extends. Member 52 has four split sections spaced 90° apart. The tip of the chalk extends downwardly through hole 42 when the member 52 is screwed in, the chalk is held removably in position for use. A pointed member 58 is secured to surface 16 remotely from opening 18 and points downwardly.

The invention can then be used as described. The cylinder, member and chalk will fit into compartment 26 when the tape is fully wound up.

As shown in FIG. 5, mechanism 38 uses housing 10, tape spool 80, tape hook 82, spring hook 84, spring housing hook 86, brake shoe liner 88, brake shoe 90, windup spring 92, snap ring 94, shaft lock 96, return spring 98 and shaft 100 attached to button 40. When button 40 is depressed, shaft 100 moves shoe 90 and liner 88 away from spool 80. The tape can be withdrawn, causing spool 80 to turn, winding up spring 92. When sufficient length of tape is exposed, button 40 is released, causing spring 98 to push ring 94 against shoe 90. This forces the liner 88 against the spool, forcing spring 90 to maintain wound up position. The button can be depressed again, disregarding the brake whereby the spring retracts and retracts the tape.

Although the invention has been described with particular reference to the drawings, the protection sought is to be limited only by the terms of the claims which follow.

What is claimed is:
1. A device which can be used as a measuring tape and as a compass, said device comprising:
a hollow housing generally rectangular in shape having a vertical front surface with a lower opening therein and a horizontal bottom surface with a front opening, the lower and front openings joining each other, said housing having an inner partition which extends vertically upward from the bottom surface and horizontally inward from the front surface to divide the interior of the housing into a small first compartment formed between these surfaces and the partition and a large second compartment in the remainder of the housing, the partition having an opening in the upwardly extending portion;
a tape spool with two ends, the spool being rotatably secured in the second compartment;
a measuring tape attached to the tape spool and rolled up around the spool, the tape having a front end having a hole, which front end extends through the partition opening;
windup means urging the spool to assume a position at which the tape is rolled up around the spool, while permitting the tape to be rolled off the spool against the pressure of the windup means;

a movable brake shoe located parallel to one of the ends of the spool and manually movable towards and away from it;

a brake lining located between the spool and the shoe so as to be pressed between the shoe and spool when the shoe is moved towards the spool and not to be so pressed when the shoe is moved away from the spool, whereby movement of the spool is prevented when the shoe is moved towards the spool and permitted otherwise;

a holder for detachably receiving a chalk and the like, said holder being secured to the front end of the tape and extending at right angles to the major surfaces of the tape whereby a chalk disposed in the holder has a tip extending downwardly through the hole, said holder fitting into the first compartment when said tape is wound on said spool to its fullest extent; and a pointed member secured to said bottom surface of the housing remote from the front opening and pointing vertically downwardly.

2. The device of claim 1 wherein said lower and front openings join in a cutout region and the front end of the tape has a lip engagable with said region.

3. The device of claim 2 wherein said holder includes a threaded hollow cylinder and a member engaging said cylinder.

4. The device of claim 3 wherein said member has a chalk receiving bore.

* * * * *